US006421755B1

United States Patent
Rao

(10) Patent No.: US 6,421,755 B1
(45) Date of Patent: Jul. 16, 2002

(54) SYSTEM RESOURCE ASSIGNMENT FOR A HOT INSERTED DEVICE

(75) Inventor: Anil V. Rao, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/320,263

(22) Filed: May 26, 1999

(51) Int. Cl.[7] ............................................. G06F 13/00
(52) U.S. Cl. ..................................................... 710/302
(58) Field of Search .................................. 710/102, 103, 710/104, 126, 10, 128, 2, 72, 8, 1, 300–304; 713/300; 711/100

(56) References Cited

U.S. PATENT DOCUMENTS

| | | | |
|---|---|---|---|
| 4,825,357 A | | 4/1989 | Ovies et al. ................. 364/200 |
| 5,386,567 A | * | 1/1995 | Lein et al. ................... 710/302 |
| 5,446,869 A | | 8/1995 | Padgett et al. ............... 395/500 |
| 5,568,610 A | | 10/1996 | Brown ................... 395/185.01 |
| 5,590,023 A | | 12/1996 | Hernandez et al. .......... 361/683 |
| 5,636,342 A | | 6/1997 | Jeffries ................... 395/185.01 |
| 5,761,451 A | | 6/1998 | Abert et al. ................. 395/293 |
| 5,761,462 A | | 6/1998 | Neal et al. ................... 395/309 |
| 5,768,541 A | | 6/1998 | Pan-Ratzlaff ................ 395/283 |
| 5,784,576 A | | 7/1998 | Guthrie et al. ............... 395/283 |
| 5,898,845 A | * | 4/1999 | Frantz et al. ................ 710/302 |
| 6,009,480 A | * | 12/1999 | Pleso .......................... 710/302 |
| 6,223,234 B1 | * | 4/2001 | Mahalingam ................ 710/302 |
| 6,230,240 B1 | * | 5/2001 | Shrader et al. .............. 710/302 |
| 6,243,773 B1 | * | 6/2001 | Mahalingam ................ 710/302 |
| 6,247,079 B1 | * | 6/2001 | Papa et al. ................... 710/302 |

OTHER PUBLICATIONS

Operating System Concepts, Silberschatz et al, 1992, third edition, Chapter 7.*
Stuart W. Hayes and Mukund P. Khatri; "Method For Alerting An Hot–Plug Interface Of Adapter Card Insertion And Removal"; U.S. Serial No.: 09/211,321; Filed Dec. 15, 1998; 26 pages of Specification (including claims); and 8 Sheets of Drawings. (Copy Not Enclosed).
Alan Goodrum; "*PCI Hot–Plug Application & Design*"; 1998; pp. 1–162. (Copy Enclosed).

* cited by examiner

*Primary Examiner*—Paul R. Myers
(74) *Attorney, Agent, or Firm*—Skjerven Morrill LLP; David G. Dolezal

(57) ABSTRACT

A hot insertion system for assigning system resources of a computer system to a hot inserted adapter circuit such as a device mounted on a PCI adapter card. The adapter circuit is hot inserted to the computer system via a connector such as a slot connector. Apertures of a system resource such as I/O address space, memory address space, and interrupt numbers, are reserved for each computer bus of the computer system. The devices located on the computer bus are assigned portions of each system resource aperture in a top down configuration. A system resource assignment routine finds the lowest assigned address of a system resource aperture to determine whether the aperture has enough assignable capacity for a hot inserted adapter circuit. If enough assignable capacity exists, then the system resource assignment routine assigns a portion of each system resource aperture located below lowest assigned address to the adapter circuit.

52 Claims, 12 Drawing Sheets

SYSTEM RESOURCE ASSIGNMENT FOR A HOT INSERTED DEVICE

BACKGROUND OF THE INVENTION

1. Field of the Invention

This invention relates in general to computer systems and in particular to the assignment of system resources to a hot inserted device in a computer system.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and a number of peripheral devices that provide input and output for the system. Such peripheral devices may include display monitors, keyboards, mouse-type input devices, floppy and hard disk drives, CD-ROM drives, printers, network capability cards, terminal devices, modems, televisions, sound devices, voice recognition devices, electronic pen devices, and mass storage devices such as tape drives, CD-R drives, or DVDs.

Computer systems perform essential operations for many businesses thereby making computer system down time highly undesirable. Consequently, systems have been developed to allow devices to be "hot inserted" to the computer system. Hot inserting typically refers to a process of operably coupling computer hardware to a computer system without stopping the execution of software or powering-down the computer system as a whole. The process may include stopping the execution of a part of the software or powering down part of the hardware.

Hot insertable devices may be mounted to adapter cards or housed in adapter carriages or carriers that are physically insertable into slots or bays of a computer system. The adapter card or carriage typically includes an electrical connector that physically connects to a bus connector such as a slot connector located on the bus. Typically, for hot insertion of a device, after the physical installation of the device in the computer system, system resources such as memory address space, I/O address space, interrupt assignments, and computer bus numbers are assigned to the device or devices (as with a multi device adapter circuit).

With a "like-for-like" hot removal and insertion, where an old adapter card is hot replaced by an adapter card of the same type, the system resources assigned to the hot removed adapter card can be assigned to the hot inserted adapter card. However, if the hot inserted card is of a different type or if a new device is being added to the computer system, then new system resource assignments are typically needed. One system of hot insertion of a device mounted to an adapter card is set forth in of a Peripheral Component Interconnect (PCI) Hot-Plug Specification, Rev. 1.0.

Some systems for assigning system resources to a hot inserted device (other than in a like-for-like hot replacement, such as in a hot add or hot upgrade) include the rearrangement of the assigned resources for all devices on a bus. However, such a strategy typically requires the interruption of service in the devices whose system resource assignments are being moved. Another alternative is to reserve holes or apertures in the system resource for a computer bus that are larger than needed for the devices operably coupled to the computer bus during the startup of the computer system. One such system is described in *PCI Hot Plug Application and Design*, by Alan Goodrum, Annabooks, San Diego, Calif., 1998.

In order to assign system resources to a hot inserted device, the system must know how much of the system resource reserved for the bus has been assigned. This may present a problem if the device assignments are not stored in a memory device such as an NVRAM that is accessible to the hot insertion system.

SUMMARY OF THE INVENTION

It has been discovered that providing a computer system with a hot insertion system allows for system resources reserved for a computer bus to be assigned to a hot inserted adapter circuit. Assigning the system resources to an adapter circuit on a computer bus in a top down configuration allows the hot insertion system to assign a system resource to an adapter circuit without having to store the system resource assignments in a memory accessible to a hot insertion system. Assignable capacity can be determined from the lowest assigned value of the system resource.

In one aspect, the invention includes a method for assigning system resources to an adapter circuit for a hot insertion of the adapter circuit to a computer bus of a computer system, The method includes determining a lowest assigned value assigned to a device on the computer bus of a system resource reserved for the computer bus. The method also includes determining a required quantity of the system resource required by the adapter circuit and determining whether the system resource reserved for the computer bus has an adequate assignable capacity for the required quantity below the lowest assigned value. The method further includes assigning to the adapter circuit a portion of the system resource located below the lowest assigned value if the system resource reserved for the computer bus is determined to have an adequate assignable capacity.

In another aspect of the invention, a computer system includes a computer bus having at least one hot insertable adapter connector for coupling an adapter circuit to the computer bus and at least one non volatile memory storing computer executable hot insertion code for assigning at least one system resource of the computer system to an adapter circuit hot inserted to the computer system via a hot insertable adapter connector of the computer bus. Execution of the computer executable hot insertion code determines a lowest assigned value assigned to a device on the computer bus of a system resource reserved for the computer bus and determines a required quantity of the system resource required by the adapter circuit. Execution of the computer executable hot insertion code also determines whether the system resource reserved for computer bus has an adequate assignable capacity for the required quantity below the lowest assigned value and assigns to the adapter circuit a portion of the system resource reserved for the computer bus located below the lowest assigned value if the system resource reserved for the computer bus is determined to have an adequate assignable capacity.

In another aspect of the invention, a computer system includes a computer bus having at least one hot insertable adapter connector and a hot insertion system for assigning at least one system resource to an adapter circuit hot inserted to a computer system via a hot insertable adapter connector of the computer bus. The hot insertion system assigns a portion of a system resource reserved for a computer bus to an adapter circuit hot inserted to the computer system via a hot insertable adapter connector of the computer bus. The portion assigned being located below a lowest assigned value assigned to a device operably coupled to the computer bus.

In another aspect of the invention, an article of manufacture includes a computer readable media storing computer executable hot insertion code for assigning at least one system resource of the computer system to an adapter circuit hot inserted to the computer system via a hot insertable adapter connector of a computer bus. Execution of the computer executable hot insertion code determines a lowest assigned value assigned to a device on the computer bus of a system resource reserved for the computer bus determines a required quantity of the system resource required by the adapter circuit. Execution of the computer executable hot insertion code also determines whether the system resource reserved for the computer bus has an adequate assignable capacity for the required quantity below the lowest assigned value and assigns to the adapter circuit a portion of the system resource reserved for the computer bus located below the lowest assigned value if the system resource reserved for the computer bus is determined to have an adequate assignable capacity.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following sets forth a detailed description of a mode for carrying out the invention. The description is intended to be illustrative of the invention and should not be taken to be limiting.

Figure 1:
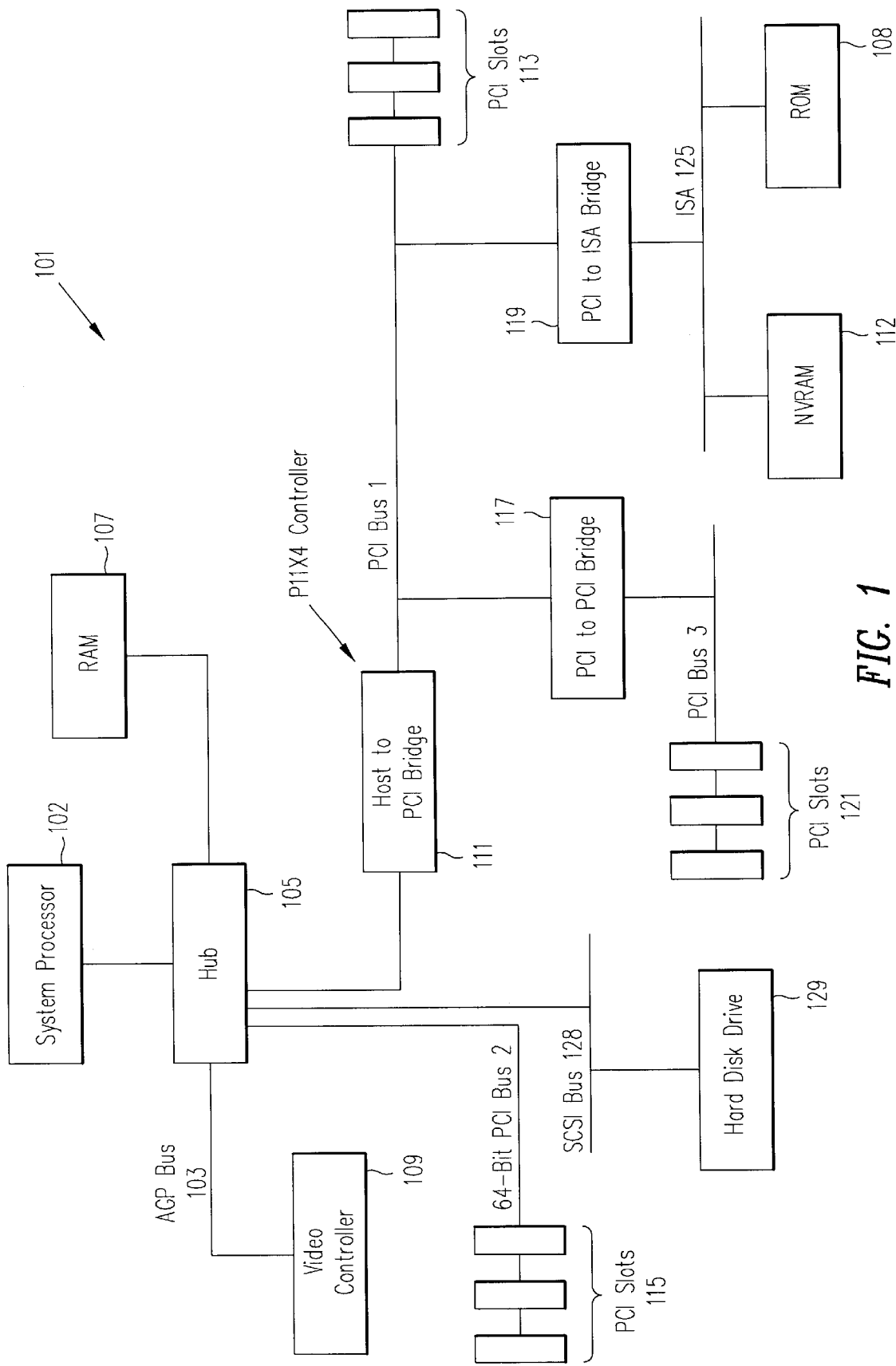
FIG. 1 is a block diagram of one example of a computer system that implements a hot insertion system according to the present invention.

FIG. 1 is a block diagram of an example of a computer system that implements a hot plug insertion system for assigning system resources to an adapter circuit hot inserted to computer system 101 via a hot insertable connector (e.g., PCI slots 113, 115, and 121). An example of a computer system is the POWER EDGE 6350 computer server sold by the DELL COMPUTER CORP. Computer system 101 includes a system processor 102 that in one example is an X86 compatible processor such as the PENTIUM III processor sold by the INTEL CORP. System processor 102 is operably coupled to other devices of computer system 101 via a chipset hub 105 which provides interface circuitry to computer busses of computer system 101. One example of a chipset hub is the 450NX chipset sold by the INTEL CORP. System processor 102 is operably coupled to RAM 107 via hub 105.

Computer system 101 includes a video controller 109 conforming to the Advanced Graphics Port (AGP) specification for providing video data to a local console (not shown). AGP video controller is operably coupled to hub 105 via AGP bus 103. With other computer systems, the video controller is located on a PCI Bus such as PCI Bus 1. Computer system 101 also includes a hard disk drive 129 that is operably coupled to system processor 102 via a computer bus 128 conforming to the Small Computer System Interface (SCSI) specification. Hard disk drive 129 includes a non volatile memory which stores computer code that is executable for the implementation of an operating system such as INTRANETWARE version 5.0 by the NOVELL CORP. to control the operations of computer system 101. Also, hard disk drive 129 stores computer code that is executable to enable the assignment of system resources to a hot inserted adapter circuit. Computer system 101 also includes a ROM device 108 that stores BIOS code executed during the startup of computer system 101. ROM device 108 is located on a computer bus 125 that conforms to the Industry Standard Architecture (ISA). A non volatile RAM 112 is also located on ISA Bus 125.

Computer system 101 includes three computer busses (PCI bus 1, PCI bus 2, and PCI bus 3) that conform to a PCI bus specification such as the PCI Local Bus specification, Rev. 2.2. PCI bus 1 is a 32 pin computer bus that is operably coupled to hub 105 via a Host to PCI Bridge circuit 111, which in one embodiment is implemented by a PIIX 4 controller sold by the INTEL CORP. Located on PCI bus 1 are PCI expansion slots 113 that allow for computer devices such as modems, network cards, and storage devices implemented on PCI adapter cards to be operably coupled to computer system 101. Embedded devices (not shown) may also be located on PCI Bus 1.

PCI bus 3 is a secondary PCI bus that is operably coupled to computer system 101 via a PCI-to-PCI bridge circuit 117 and via PCI bus 1. Located on PCI bus 3 are expansion slots 121 that allow for devices to be coupled to PCI bus 3 along with other devices (not shown). PCI bus 2 is a 64 bit PCI bus that is connected to hub 105. Located on PCI bus 2 are 64 bit PCI expansion slots 115 along with other devices (not shown).

PCI slots 113, 115, and 121 are hot insertable in that adapter cards (not shown in FIG. 1) can be hot inserted into the slots. With some computer systems, the PCI slots may also be hot removable in that adapter cards may be removed from computer system 101 without stopping the execution of computer system software or powenngdown the computer system as a whole. The hot insertion system of computer system 101 is compatible with the PCI Hot-Plug Specification, Rev. 1.0.

During the hot insertion of an adapter card into a slot (e.g., 113, 115, or 121), a system resource assignment routine of the operating system assigns system resources for the adapter card. System resources include non cacheable memory address space, prefetch memory address space, I/O address space, PCI bus numbers, and interrupt numbers.

Figure 2:
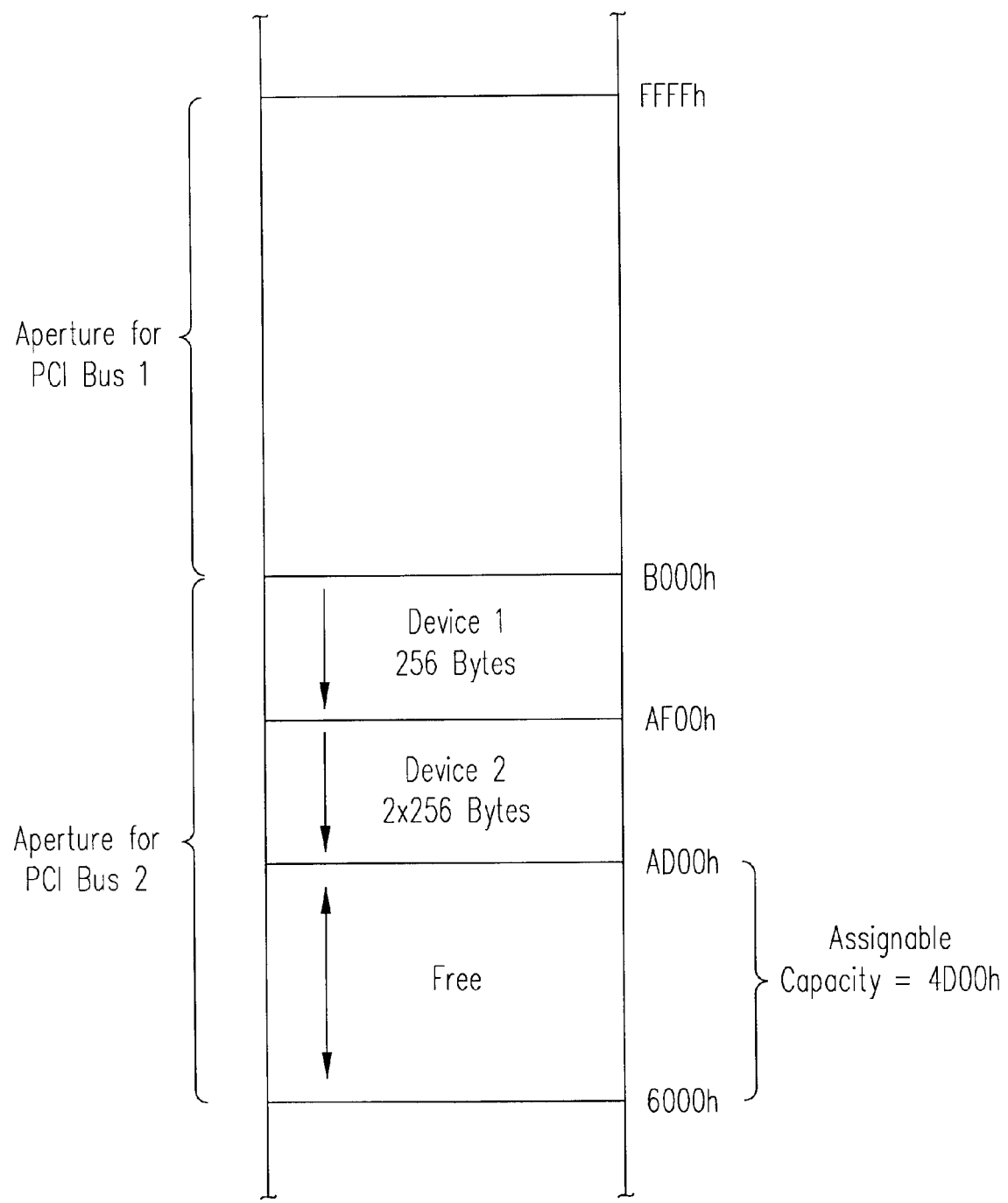
FIG. 2 is a partial map showing one example of assignments of a system resource according to the present invention.

FIG. 2 is partial map showing one example of an assignment of I/O address space of computer system 101 according to the present invention. Apertures (or holes) in the I/O address space are reserved for the computer buses of computer system 101. Devices located on a bus are assigned portions of the apertures reserved for the bus. For example, an I/O address space aperture from FFFF hex (FFFFh) to B000h is reserved for PCI Bus 1 and an aperture from AFFFh to 6000h is reserved from PCI bus 2. Device 1 and Device 2 (neither shown) are located on PCI bus 2 and are assigned during a startup BIOS routine portions of the I/O address space reserved for PCI bus 2. The I/O address space from AFFFh to AF00h is assigned to device 1 and the I/O address space from AEFFh to AD00h is assigned to device 2.

The I/O address space on computer system 101 is assigned in a top down configuration. The devices located on a bus are assigned the highest assignable portions of the reserved aperture. For example, device 1 located on PCI bus 2 is assigned a 256 byte portion from the highest assignable address AFFFh to AF00h. Device 2 located on bus 2 requires 2×256 bytes of I/O address space and accordingly, is assigned the next highest 512 bytes of I/O address space below AF00h. With some systems, devices located on a secondary bus (such as PCI bus 3) are assigned portions of the I/O address space reserved for the primary bus (PCI bus 1).

Because the I/O address space is assigned in a top down configuration, the assignable capacity of the I/O address space reserved for a computer bus can be determined from the lowest assigned address (which in FIG. 2 is AD00h for the aperture for PCI Bus 2).

The non cacheable and prefetch memory address space for computer system 101 is also assigned in a similar top down configuration. With other computer systems, bus numbers and interrupt numbers are assigned in a top down configuration as well.

FIGS. 3A–3D are flow diagrams showing one example of an assignment of system resources to an adapter card hot inserted into one of the PCI slots 113, 115, or 121 according to the present invention. The operations shown in FIGS. 3A–3D are implemented by a system resource assignment routine of a system bus driver (item 761 of FIG. 7) of an operating system of computer system 101. The routine set forth in FIGS. 3A–3D is utilized for computer systems having continuous reserved areas of system resources.

Figure 3A:
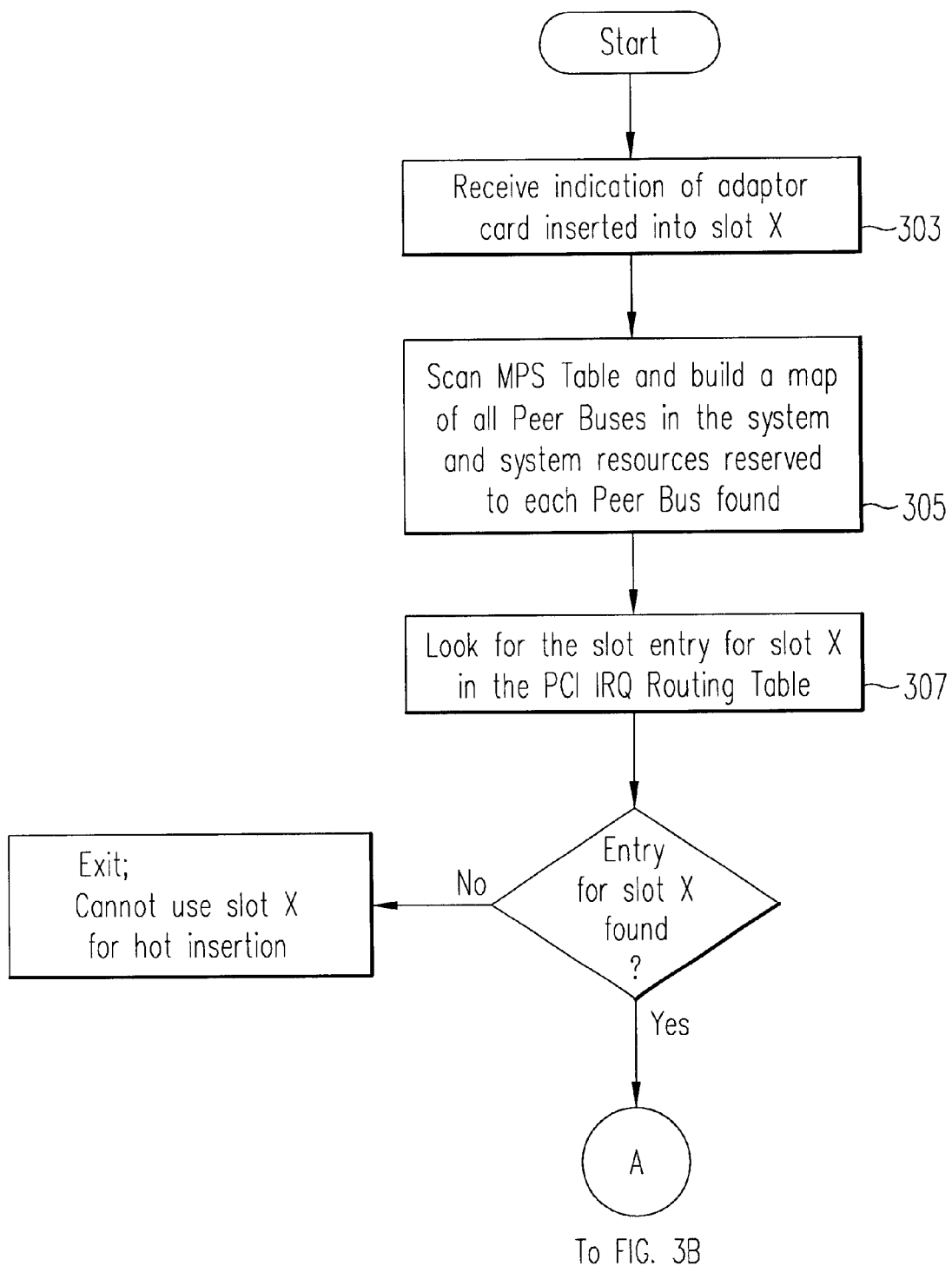
FIGS. 3A–3D are flow diagrams showing one example of an assignment of system resources to an adapter circuit according to the present invention.
Figure 3B:
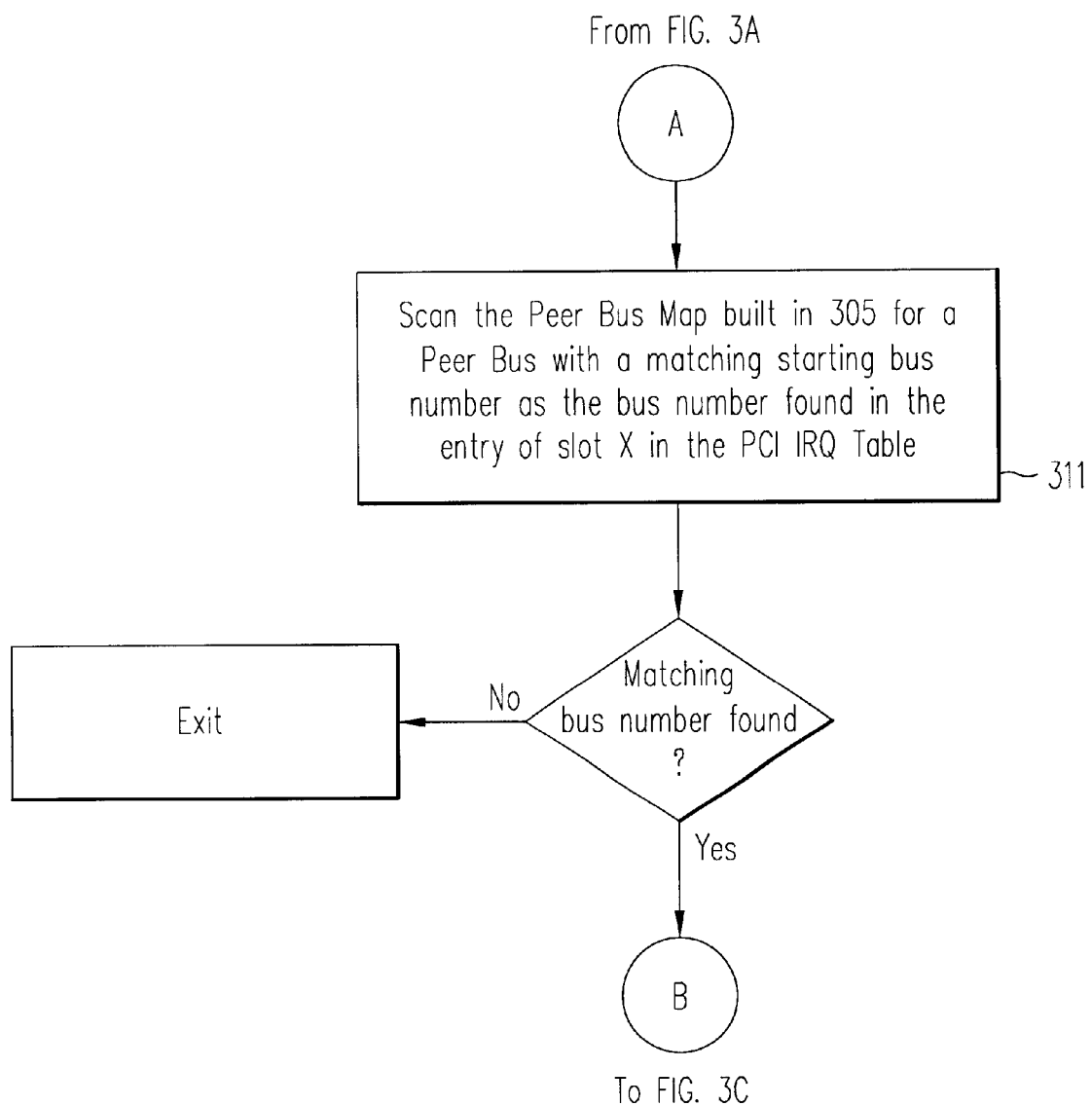
Figure 3C:
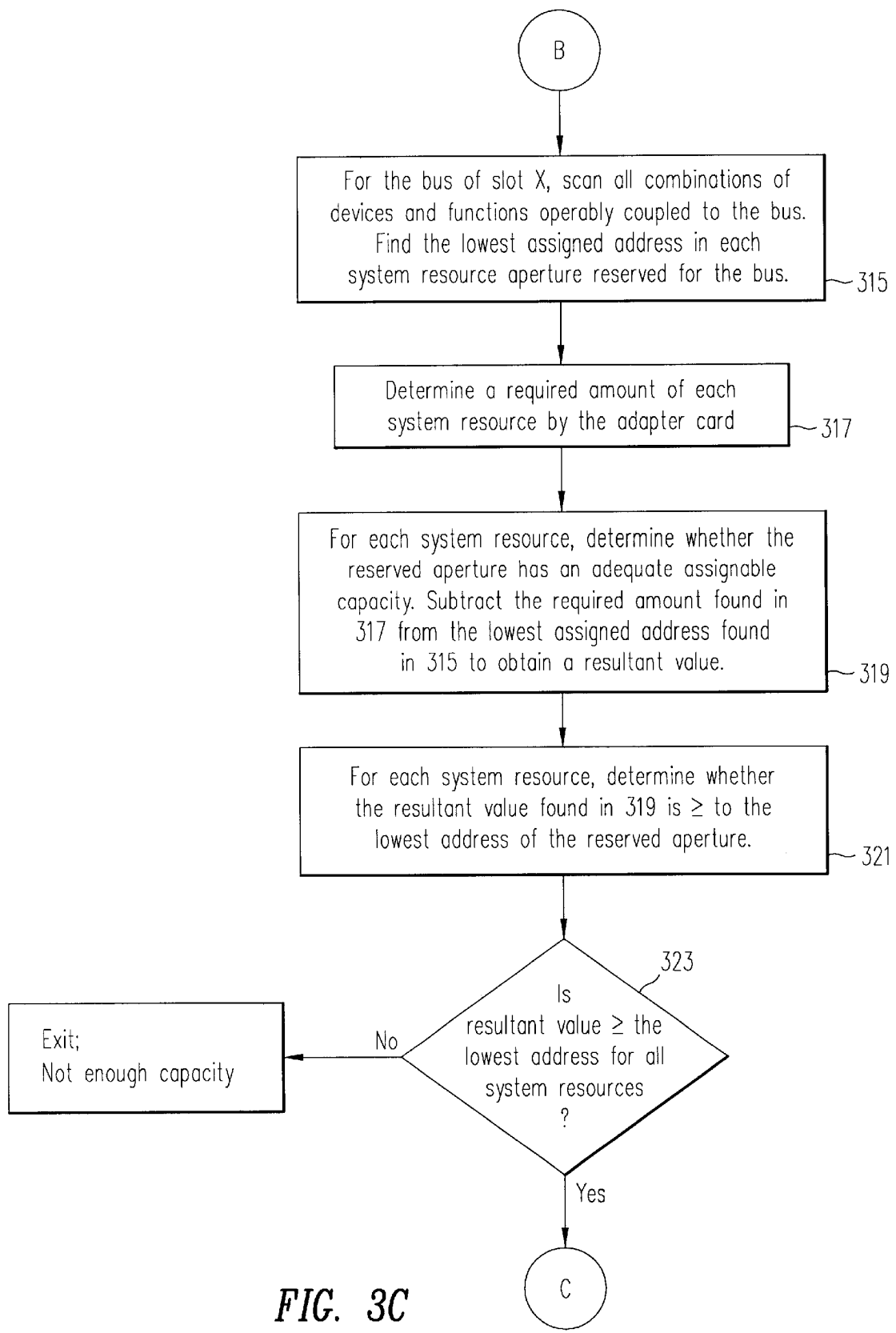
Figure 3D:
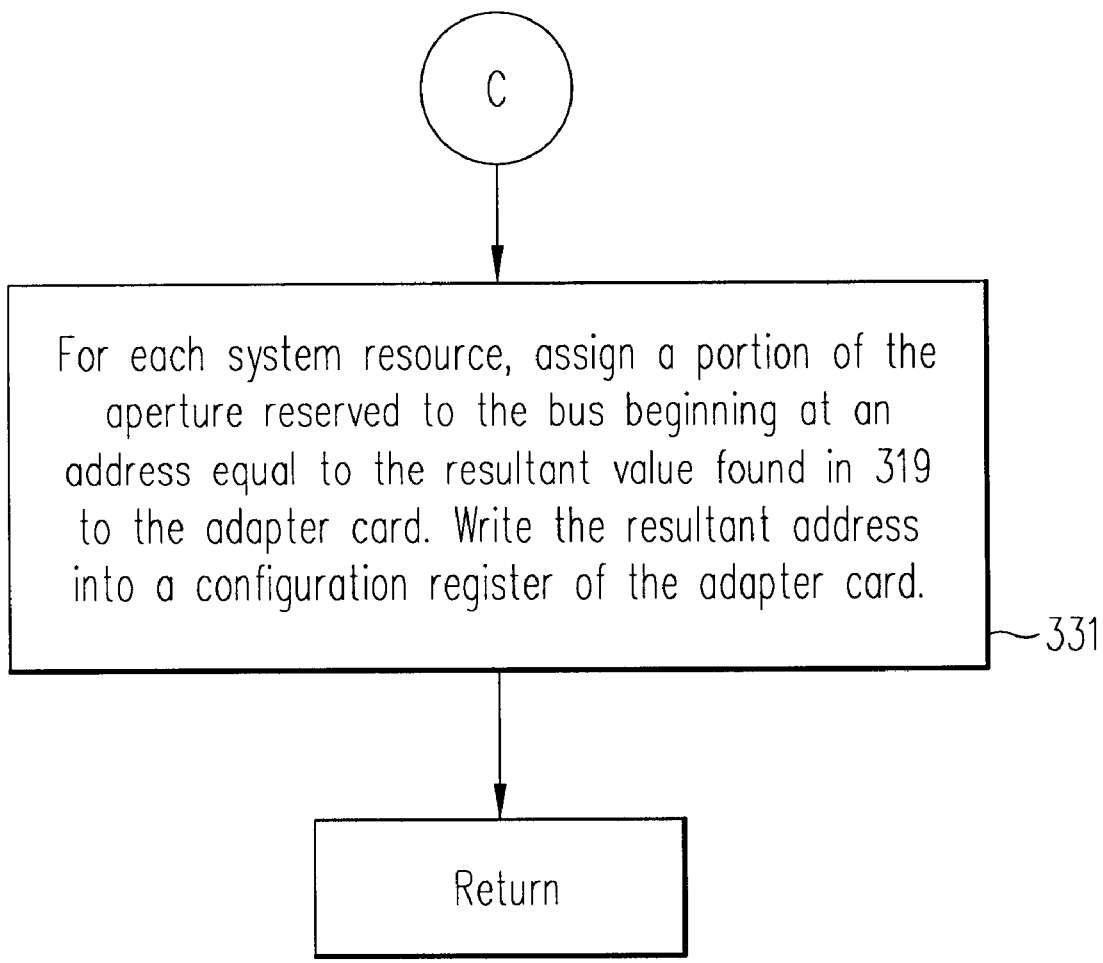
Figure 4:
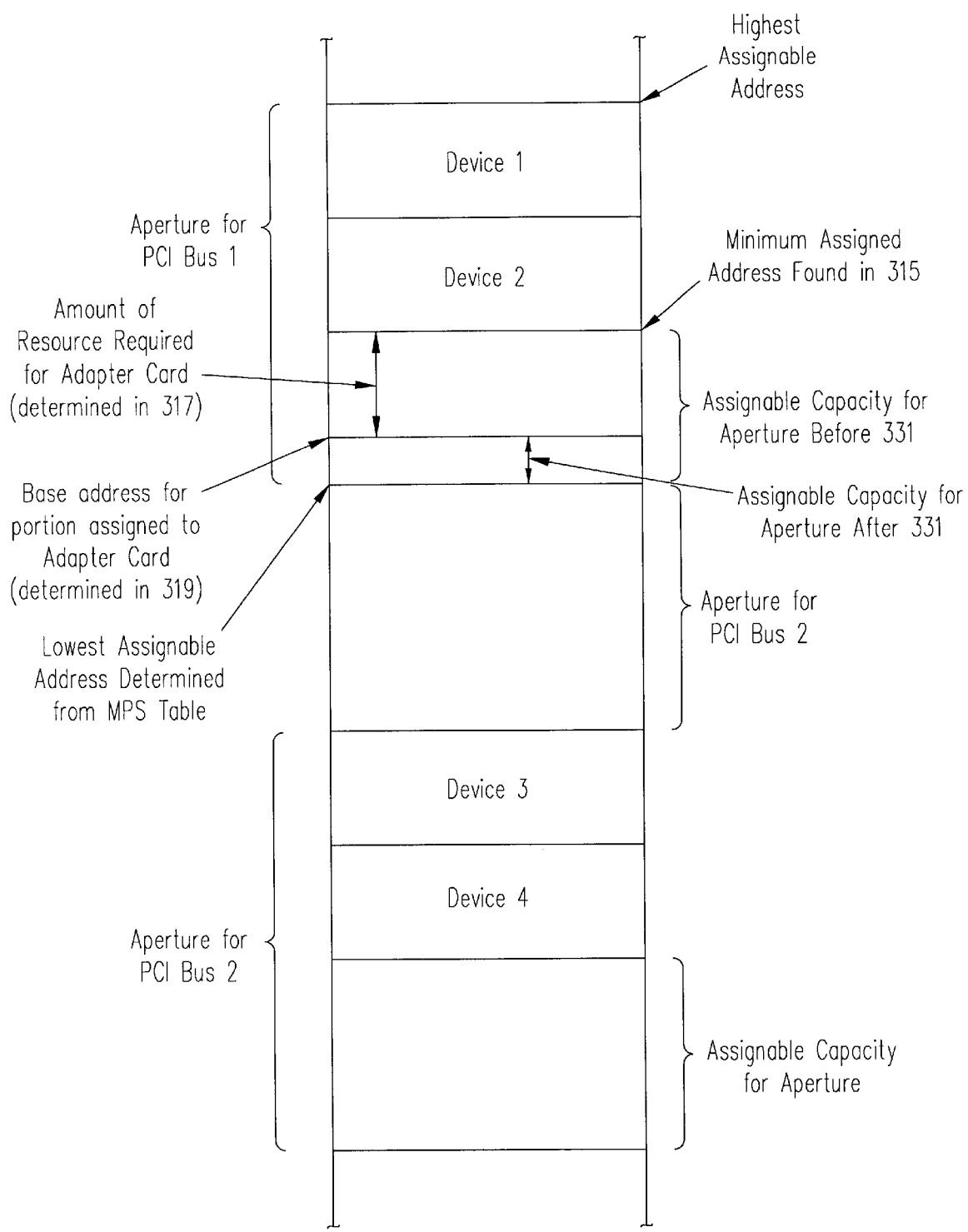
FIG. 4 is a partial map showing another example of an assignment of a system resource according to the present invention.

FIG. 4 is a partial map illustrating an example of an assignment of I/O address space as per the routine set forth in FIGS. 3A–3D. A map illustrating the assignment of memory address space is not shown.

Referring to FIG. 3A, in 303, the operating system receives an indication that an adapter card has been inserted into slot X (not shown) of a computer bus. This indication may be entered by a user via a local keyboard (not shown) or via sensors (not shown) in slot X. With some systems resource assignment routines, if the hot inserted adapter card inserted into slot X is of the same type as a hot removed adapter card from slot X (such as in a like-for-like hot replacement), bus driver 761 would initiate another routine (not shown) that would assign to the hot inserted adapter card the same portion of system resources as assigned to the hot removed adapter card.

In 305, a map of all peer busses in computer system 101 is built from a scan of a table in a memory, which in one example, is a MPS table that conforms to the Multi Processor Specification (MPS) by the INTEL CORP. The peer bus map built in 305 includes the system resources assigned to each peer bus. The MPS table includes an entry for each computer bus in computer system 101 with each entry having a bus number assigned to each bus. Each computer bus entry in the MPS table also includes extended entries that list the system resources reserved for the computer bus such as, for example, the I/O address space and memory address space reserved for a bus. The MPS table is built by the execution of BIOS startup routines during the start up of computer system 101. The MPS table is stored in RAM 107, or with other systems, is stored in Non Volatile RAM 112 that is accessible to the operating system. With other computer systems, the peer bus map is built from reading bus registers of hub 105.

In 307, the system resource assignment routine accesses a PCI IRQ routing table stored in RAM 107 (or in non volatile memory 112 with other computer systems) to determine whether slot X can be used for hot insertion. Each slot entry in the PCI IRQ table includes a slot number of the slot and a bus number of the bus on which the slot is located. If an entry for Slot X is not found in the PCI IRQ table, then slot X can not be used for hot insertion and the system resource assignment routine returns an error and exits.

Referring to FIG. 3B, if an entry for Slot X is found in the PCI IRQ table, then in 311, the system resource assignment routine scans the peer bus map built in 305 for a computer bus with a matching starting bus number as the bus number found in the PCI IRQ table entry for slot X. If no matching number is found, then the system resource assignment routine returns an error and exits.

Referring to FIG. 3C, if a matching peer bus number is found, then the system resource assignment routine attempts to determine the lowest assigned address for each system resource aperture reserved for the computer bus of slot X. In 315, the system resource assignment routine reads a base address of each configuration register for each function of each device coupled to the computer bus of slot X. For bridge circuits, such as PCI-to-PCI bridge circuit 117, all devices on the secondary side of the bridge are scanned as well, since all secondary side devices are assigned portions of a system resource aperture reserved for the primary computer bus. With some computer systems, system resource assignments (such as memory address space, prefetched memory address space, and I/O address space) are determined by reading configuration registers of bridge circuit 117.

In 317, the system resource assignment routine determines how much of each system resource is required for the hot inserted adapter card. In 317, the system resource assignment routine writes all 1's to a base address configuration register for each system resource of the adapter card and then reads those registers to determine the required amounts of system resources.

After determining a required amount for each system resource, the system resource assignment routine then determines whether the apertures of each system resource reserved for the computer bus of slot X have adequate assignable capacity. In 319, for each system resource, the system resource assignment routine subtracts the required amount found in 317 from the lowest assigned address found in 315 to obtain a resultant value. In 321, for each system resource, the resultant value found in 319 is compared with the lowest assignable address of an aperture (found from the table built in 305). If the lowest assignable address for any system resource is determined to be greater than the resultant value, then there is not enough assignable capacity for the adapter card in computer system 101 and the system resource assignment routine returns an error and exists.

Referring to FIG. 3D, if computer system 101 is determined to have enough assignable capacity for all system resources, in 331, a portion of each system resource aperture reserved for the computer bus of slot X is assigned to the adapter card. Referring to FIG. 4, the portion of an aperture assigned is from below the lowest assigned address (found in 315) to an address equal to the resultant value found in 319. For each system resource, the resultant value found in 319 is written to a base configuration register of the adapter card. For some computer systems to assign interrupt numbers, after the IRQ device is set in the hot insertion device, the programmable interrupt controller (PIC) is set up if in a uniprocessor mode and the I/O Advanced Programmable interrupt controller (IOAPIC) is set up if in a multiprocessor mode.

Figure 5A:
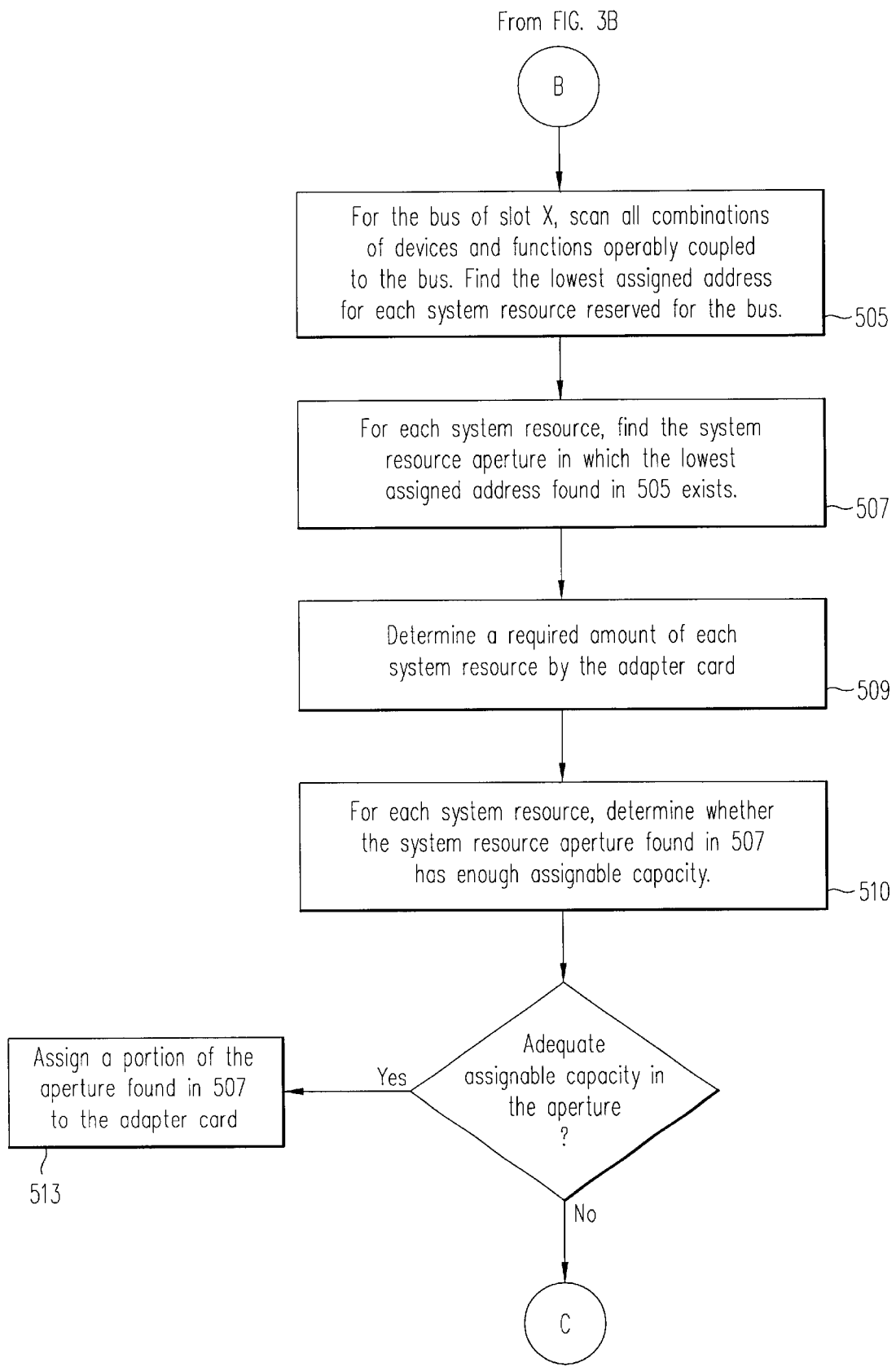
FIGS. 5A–5B are flow diagrams showing another example of an assignment of system resources to an adapter circuit according to the present invention.
Figure 5B:
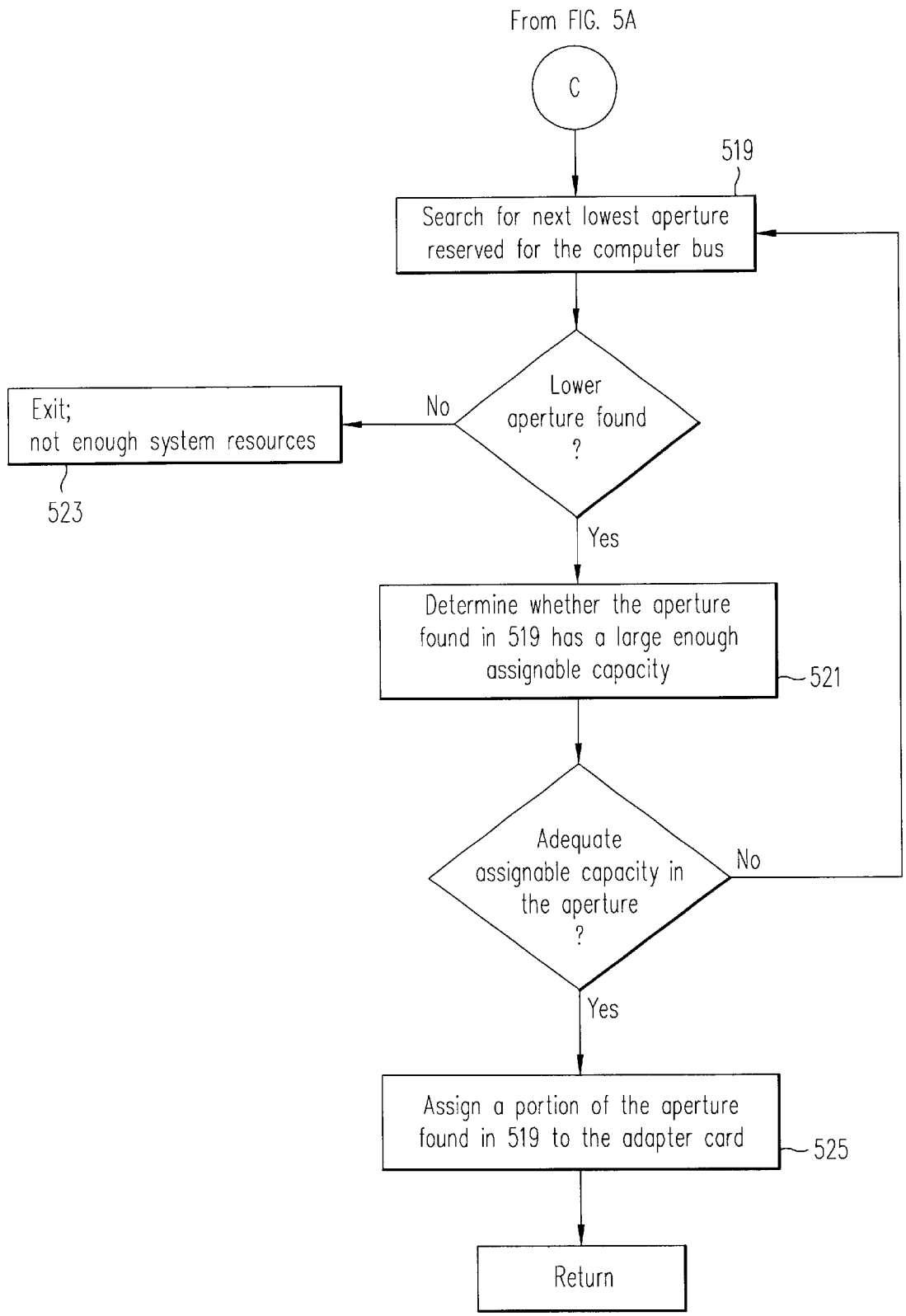
Figure 6:
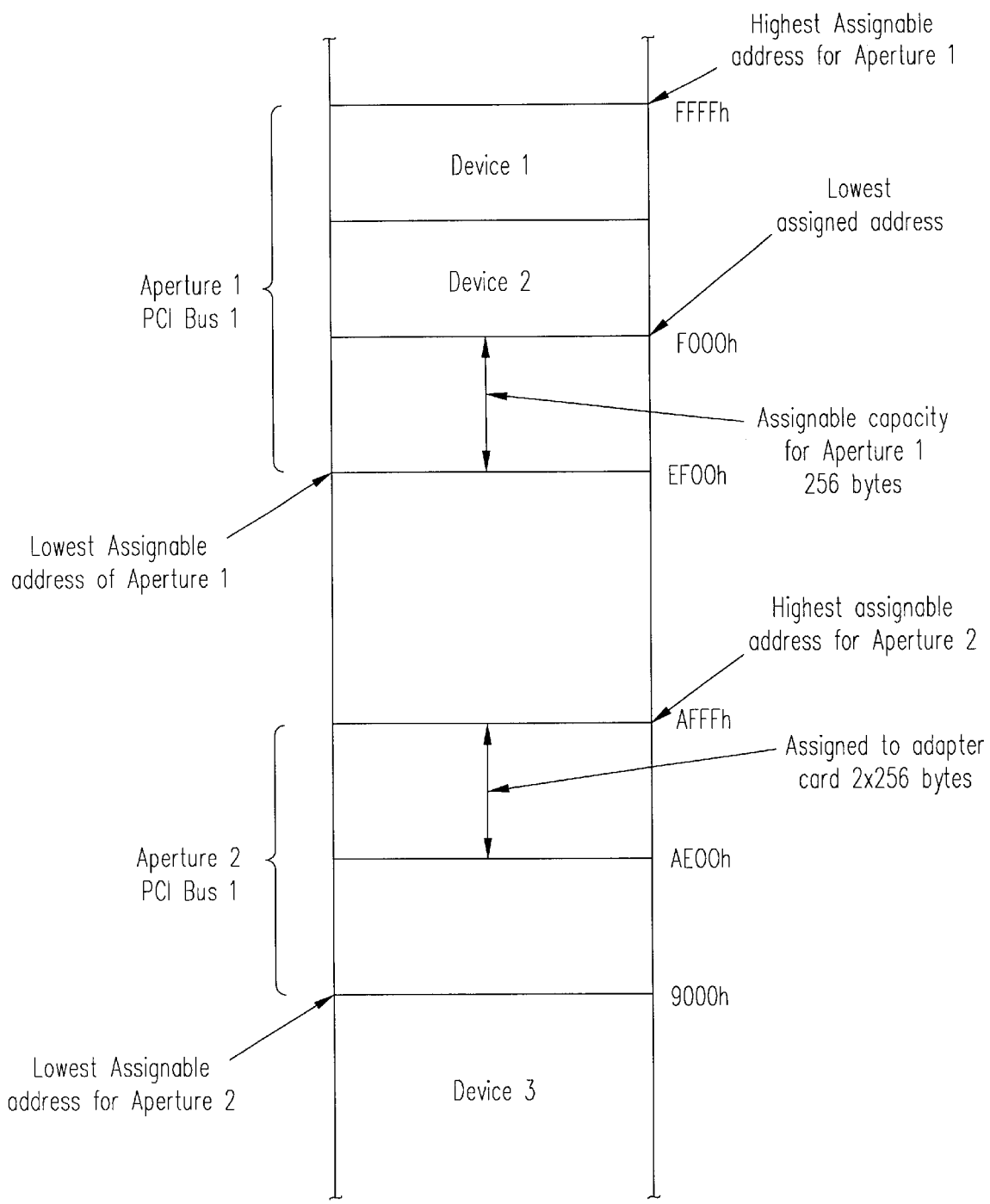
FIG. 6 is a partial map showing another example of an assignment of a system resource according to the present invention.

Referring to FIGS. 5A–5B and FIG. 6, the system resource assignment routine of computer system 101 can be modified to assign a portion of a reserved system resource where the system resource reserved for a computer bus is non continuous. With a non continuous reserved system resource, multiple apertures of a system resource are reserved for a computer bus. In FIG. 6, two apertures (Aperture 1 and Aperture 2) are reserved for PCI bus 1 with the addresses from B000h to EEFFh being reserved for other busses or devices (neither shown) of computer system 101.

The first part of the system resource assignment routine set forth in FIGS. 5A and 5B is the same as that set forth in FIGS. 3A and 3B. Accordingly, the system resource assignment routine set forth in FIGS. 5A and 5B includes the operation set forth in FIGS. 3A and 3B. Referring to FIG. 5A, in 505 the system resource assignment routine scans all functions of all devices located on the computer bus of slot X to find the lowest assigned address for each system resource (similar to operation 315 of FIG. 3C). In 507, for each system resource, the system resource assignment routine accesses the table built in 305 to find the aperture that includes the lowest assigned address. Because the portions of the system resource are assigned in a top down configuration, the apertures located above the lowest assigned address are presumed not to have assignable capacity.

In 509, for each system resource, the system resource assignment routine determines the required amount of system resource by the hot inserted adapter card (see the description of operation 317 of FIG. 3C). In 510, for each system resource, the system resource assignment routine determines whether the aperture which includes the lowest assigned address found in 505 has enough assignable capacity for the required amount found in 507 (see the description of operations 319 and 321). If an aperture has adequate assignable capacity, then in 513, that highest assignable portion of the assignable capacity is assigned to the adapter card (see the description of operation 331 of FIG. 3D).

Referring to FIG. 5B, for those system resources where an adequate amount of assignable capacity is not found in the aperture having the lowest assigned address, in 519, the system resource assignment routine searches the map built in 305 for the next lowest aperture reserved for the computer bus of slot X. If a lower aperture is not found, the system resource assignment routine exits in 523 because there is not enough capacity for the adapter card.

If a lower system resource aperture is found in 519, the system configuration routine determines in 521 whether that aperture has adequate assignable capacity for the required amount. If the aperture found in 519 does not have adequate assignable capacity, then the system resource assignment routine loops back to 519 to find the next lowest aperture.

If an aperture with an adequate assignable capacity is found, then in 525, the system resource assignment routine assigns the highest assignable portion of that aperture to the hot inserted adapter card.

FIG. 6 is a partial system resource map for a computer system having multiple apertures of I/O address space reserved for a computer bus. Because the adapter card being hot inserted requires 2×256 bytes of I/O address space, Aperture 1, the aperture having the lowest assigned address (F000h for device 2), does not have adequate assignable capacity for the hot inserted adapter card. Consequently, a system resource assignment routine as set forth in FIGS. 5A and 5B would make a determination of whether Aperture 2, the next lowest aperture, has adequate assignable capacity for the adapter card. Because Aperture 2 has a large enough assignable capacity for the required amount (2×256 bytes), the highest assignable 512 bytes of Aperture 2 (AFFFh to AE00h) would be assigned to the hot inserted adapter card.

Although the system resource assignment routines of FIGS. 3A–3D and FIGS. 5A–5B describes the assignment of address space (such I/O or memory), those of skill in the art will appreciate that, based upon the teachings herein, other system resources being assignable by numbers or positions (such as bus numbers or interrupt numbers) may also be assigned in a similar manner. For example, a group of bus numbers may be reserved for a computer bus. The bus numbers reserved for a bus would be assigned to devices of the bus in a top down configuration. After a determination of the lowest assigned reserved bus number, the hot inserted adapter circuit would be assigned the next lowest reserved bus number available.

Those of skill in the art will recognize that, based upon the teaching herein, modifications may be made to the operations set forth in FIGS. 3A–3D and FIGS. 5A–5B. For example, to determine whether an aperture has adequate assignable capacity, a routine may subtract a lowest assignable address from the lowest assigned address to obtain a resultant value, wherein the resultant value would be compared with the required amount of a system resource by an adapter card.

Figure 7:
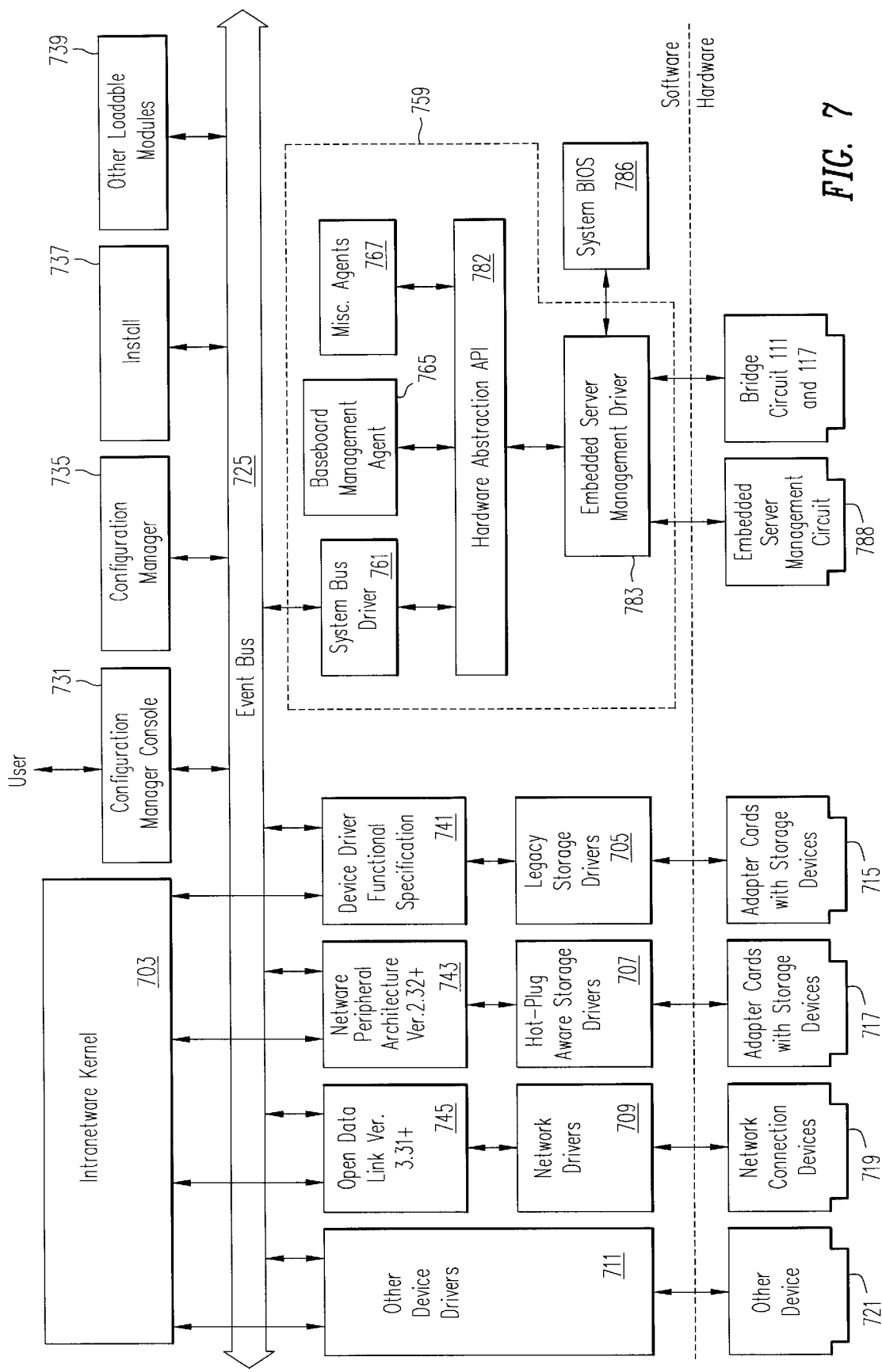
FIG. 7 is a software architecture block diagram showing one example of a hot insertion system architecture according to the present invention.

FIG. 7 is a software architecture block diagram of the operating system of computer system 101 implementing a hot insertion system according to the present invention. The hot insertion system shown in FIG. 7 is implemented in the INTRANETWARE operating system by the NOVELL CORP.

The hot insertion system of computer system 101 includes a group of software modules collectively referred to as a hot plug system driver 759. A hot plug system driver may exist for each computer bus having hot pluggable slots. Hot plug system bus driver 759 includes a system bus driver 761, a baseboard management agent 765, miscellaneous agents 767, a hardware abstraction Applications Program Interface (API) 782, and an embedded server management driver 783 which is a device driver for an embedded server management circuit 788 that turns on and off the hot pluggable PCI slots (e.g., slots 113, 115, and 121). The embedded server management driver 783 also serves as a device driver for Host-to-PCI bridge circuit 111 and the PCI-to-PCI bridge circuit 117. During the start up of computer system 101, the embedded server management driver 783 interacts with the system BIOS 786 (stored in ROM 108) to initialize the configuration headers of devices coupled to a PCI computer bus during the startup of computer bus 101.

Intranetware Kernel 703 represents the rest of the INTRANETWARE operating system not shown in FIG. 7. Intranetware Kernel 703 is operably coupled to other modules of the operating system via a conventional event bus 725 which is a communications channel for the modules of the operating system.

Legacy storage drivers 705 are conventional device drivers for storage devices (mounted on adapter cards) 715 coupled to the computer busses via slot connectors conforming to past, non hot-insertable standards. Hot-Plug aware storage drivers 707 are conventional device drivers for storage devices 717 that are hot pluggable. One example of a storage device is a hard disk drive of a SCSI system. Network drivers 709 are conventional device drivers for control network connection devices 719 allowing computer system 101 to be operably coupled to Local Area Networks (LANS) and Wide Area Networks (WANs). Other device drivers 711 represents the device drivers for other conventional types of devices 721 not specifically shown. Devices 721 and 719 may be embedded or mounted on cards or carriages that are hot insertable. The hot insertion system also includes conventional interface modules 741, 743, and 745 for device drivers 705, 707, and 709, respectively.

The hot insertion system of computer system 101 also includes a conventional configuration manager console module 731 for providing user interface to the hot plug system (e.g., see operation 303 of FIG. 3A). The hot insertion system also includes a conventional configuration manager 735 which controls the hot insertion operations and starts new device drivers for added devices. Configuration manager 735 notifies system bus driver 761 via event bus messages to turn on a hot-pluggable slot with a hot inserted adapter card and initialize the configuration registers of the adapter card with the system resource assignments (see the discussion of FIG. 8 below). The install module 737 finds the appropriate device drivers for a device(s) of a hot inserted adapter card. Other loadable modules 739 includes other event bus modules that can be loaded under the INTRANETWARE operating system. The install module 737 and the other loadable modules 739 are also conventional.

Figure 8:
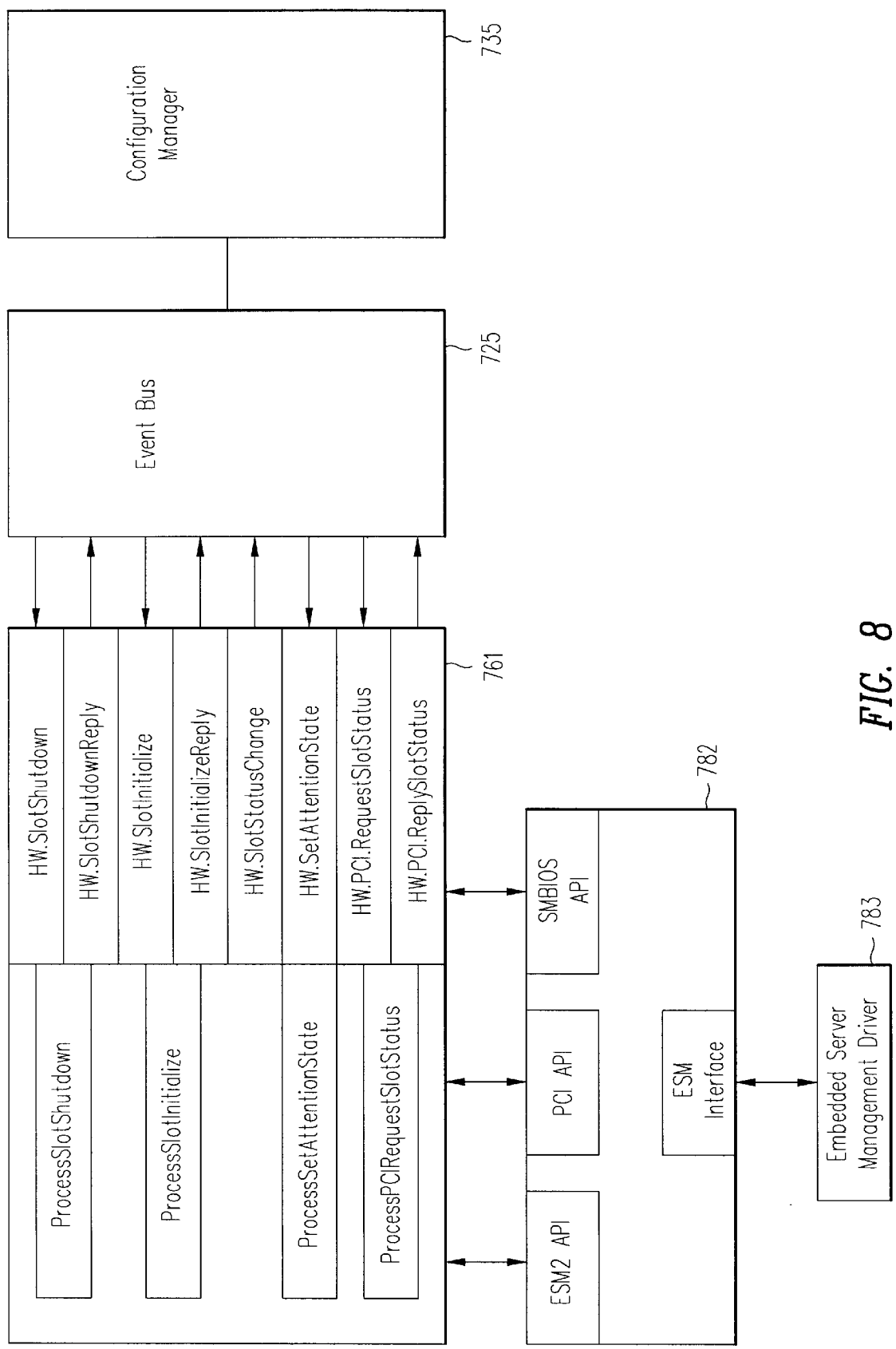
FIG. 8 is a software architecture block diagram of a system bus driver of the system architecture shown in FIG. 7 according to the present invention. The use of the same reference symbols in different drawings indicates identical items unless otherwise noted.

FIG. 8 is a software architecture block diagram of system bus driver 761 and hardware API 782. Hardware API 782 includes an embedded server manager API, a PCI bus API, and an SMBIOS API as well as an embedded server interface (ESM interface).

Shown within the left side of system bus driver 761 are processes (e.g., ProcessSlotShutdown) performed by system bus driver 761. Shown on the right side of system bus driver 761 are conventional Intranetware event bus messages (e.g., HW.SlotShutdown) received and sent to the configuration manager 735 via the event bus 725.

In response to receiving a HW.Slotinitialize event bus message, system bus driver 761 executes the ProcessSlotInitialize process to turn on a slot and to initialize an adapter card inserted into the slot. Included within this process is the assignment of system resources to the adapter card as per the routines set forth in FIGS. 3A–3D or FIGS. 5A–5B. The ProcessSlotInitalize process may also include routines that assign some system resources based upon assignment tables wherein the assignments of a system resource to devices on a bus are stored in a memory and are utilized in assigning a system resource to a hot inserted adapter circuit. After the slot has been initialized, system bus driver 761 replies with the event bus message HW.SlotInitiatizedReply to the configuration manager 735.

System bus driver 761 performs the ProcessSlotShutdown process in response to receiving a HW.SlotShutdown event bus message to shut down a specific slot. After the process is performed, system bus driver 761 replies with a HW.SlotShutdownReply event bus message to configuration manager 735. System bus driver 761 also performs other processes such as ProcessSetAttentionState to turn on an off an attention LED (not shown). In response to receiving a request for detailed information on a slot via a HW.PCI.RequestSlotStatus event bus message, system bus driver 761 performs a ProcessPCIRequestSlotStatus process to obtain the detailed information on the desired slot and provides that information to configuration manager 735 via the HW.PCI.ReplySlotStatus message.

The hot plug insertion system shown in FIGS. 7 and 8 represents one example of a hot plug insertion system which is implemented with the INTRANETWARE operating system. Those of skill in the art will recognize that, based upon the teachings herein, a hot plug insertion system may have other configurations and/or may be implemented in other computer system having other types of operating systems such as WINDOWS NT by MICROSOFT.

The computer code for the software modules shown and described in FIGS. 7 and 8 are stored in hard disk drive 129. However, the computer code may be stored in or provided to computer system 101 in other types of computer readable media. Computer readable media may be permanently, removably, or remotely coupled to computer system 101 or may be integral with computer system 101 such as with hard disk drive 129. Computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM, or application specific integrated circuits; volatile storage media including registers, buffers, or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Those of skill in the art will recognize that, based upon the teachings herein, several modifications may be made to the embodiments shown in FIGS. 1–8. For example, a hot insertion system according to the present invention may be utilized for other computer busses conforming to standards that allow the hot insertion of devices to the bus. One example of such a bus standard is the Next Generation I/O Bus standard (NGIO) by the INTEL CORP. The system resource assignment routine may be utilized with other types of adapter circuits such as adapter circuits mounted in carriages that are hot inserted or adapter cards having multiple devices. Also, the hot insertion system may be implemented in other forms of computer systems having other configurations other than that shown in FIG. 1.

The system management routine set forth in FIGS. 3A–3D and 5A–5B may be utilized to assign other system resources to an adapter circuit such as bus numbers, IRQ numbers, and prefetch memory address space.

Also, although in computer system 101, the operations of system resource assignment (such as those set forth in FIGS. 3A–3D and FIGS. 5A–5B) are performed by the system resource assignment routine of the ProcessSlotInitialize Process of system bus driver 761, the operations of system resource assignment may be performed, in whole or in part, by other routines, by other processes of a system bus driver, by other modules of the operating system, and/or by computer code executed by other hardware components of a computer system. For example, part of the operations of system resource assignment maybe performed by more than one module of an operating system. Also, some of the operations may be performed by other controllers of a computer system such as by an embedded server management circuit. For example, a determination of a required amount of system resources for an adapter card may be performed and calculated by the embedded server management circuit (e.g., circuit 788) and returned to a system bus driver.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for assigning system resources to an adapter circuit for a hot insertion of the adapter circuit to a computer bus of a computer system comprising:
   determining a lowest assigned value assigned to a device on the computer bus of a system resource reserved for the computer bus;
   determining a required quantity of the system resource required by the adapter circuit;
   determining whether the system resource reserved for the computer bus has an adequate assignable capacity for the required quantity below the lowest assigned value;
   assigning to the adapter circuit a portion of the system resource located below the lowest assigned value if the system resource reserved for the computer bus is determined to have an adequate assignable capacity;
   wherein the lowest assigned value is located in an aperture of the system resource reserved for the computer bus, wherein the determining whether the system resource reserved for computer bus has an adequate assignable capacity further includes determining whether the aperture has an adequate assignable capacity for the required quantity;
   wherein the determining whether the system resource reserved for computer bus has an adequate assignable capacity for the required quantity further includes:
   determining, if the aperture does not have an adequate assignable capacity, whether a second aperture of the system resource reserved for the computer bus located below the aperture has an adequate assignable capacity.

2. The method of claim 1 wherein the determining a required quantity of system resource required by the adapter circuit further includes:
   accessing a configuration register of the adapter circuit to determine the required quantity.

3. The method of claim 1 wherein the assigning to the adapter circuit a portion of the system resource located below the lowest assigned value includes writing to a configuration register of the adapter circuit an indication of a base value of the assigned portion.

4. The method of claim 1 wherein the assigning to the adapter circuit a portion of the system resource further includes assigning to the adapter circuit a portion of the aperture between from below the lowest assigned value to the lowest aperture value if the aperture is determined to have an adequate assignable capacity.

5. The method of claim 5 further wherein the assigning to the adapter circuit a portion of the aperture further includes assigning to the adapter circuit a potion of the aperture from below the lowest assigned value to a value being equal to the lowest assigned value minus the required quantity of system resource for the adapter circuit.

6. The method of claim 1 wherein:
   the assigning to the adapter circuit a portion of the system resource further includes assigning to the adapter circuit a portion of the second aperture if the second aperture is determined to have an adequate assignable capacity.

7. The method of claim 1 wherein the determining whether the aperture has an adequate assignable capacity further includes:
   subtracting the required quantity from the lowest assigned value to obtain a resultant value;
   determining whether the resultant value is greater than or equal to a lowest aperture value.

8. The method of claim 1 wherein:
   the system resource includes a memory address space of the computer system.

9. The method of claim 1 wherein:
   the lowest assigned value includes a lowest assigned memory address of the memory address space reserved for the bus;
   the required quantity includes a memory address space required by the adapter circuit.

10. The method of claim 1 wherein the memory address space is pre-fetch memory address space.

11. The method of claim 1 wherein:
    the system resource includes I/O address space of the computer system;
    the lowest assigned value includes the lowest assigned I/O address;
    the required quantity includes an I/O address space required by the adapter circuit.

12. The method of claim 1 further comprising:
    accessing a computer bus resource table stored in a memory of the computer system to determine the system resource reserved for the computer bus.

13. The method of clam 1 wherein the computer bus conforms to a standard based upon a Peripheral Component Interface (PCI) Specification.

14. The method of claim 1 wherein the method of claim 1 is compatible with a Peripheral Component Interface (PCI) Hot-Plug Specification.

15. The method of claim 1 wherein the adapter circuit is hot inserted to the computer bus via a slot connector located on the bus, the method further comprising:
    accessing an IRQ routing table in a memory of the computer system to determine whether an adapter circuit is capable of being hot inserted to the computer bus via the slot connector.

16. The method of claim 1 wherein determining a lowest assigned value includes reading at least one configuration register of each device operably coupled to the computer bus.

17. The method of claim 1 wherein the assigning to the adapter circuit a portion of the system resource further includes assigning to the adapter circuit a highest assignable portion of the system resource reserved for the computer bus located below the lowest assigned value.

18. The method of claim 1 comprising
assigning a same portion of the system resource to a hot inserted adapter circuit as was assigned to an adapter circuit of the same type as the hot inserted adapter circuit that was hot removed from an adapter connector located on the computer bus that the hot inserted adapter circuit is being connected for hot insertion to the computer system.

19. A computer system comprising:
a computer bus having at least one hot insertable adapter connector for coupling an adapter circuit to the computer bus; and
at least one non volatile memory storing computer executable hot insertion code for assigning at least one system resource of the computer system to an adapter circuit hot inserted to the computer system via a hot insertable adapter connector of the computer bus, wherein execution of the computer executable hot insertion code:
determines a lowest assigned value assigned to a device on the computer bus of a system resource reserved for the computer bus;
determines a required quantity of the system resource required by the adapter circuit;
determines whether the system resource reserved for computer bus has an adequate assignable capacity for the required quantity below the lowest assigned value, wherein the lowest assigned value is located in an aperture of the system resource reserved for the computer bus, wherein the determination of whether the system resource reserved for computer bus has an adequate assignable capacity further includes:
a determination of whether the aperture has an adequate assignable capacity for the required quantity; and
a determination, if the aperture does not have an adequate assignable capacity, whether a second aperture of the system resource reserved for the computer bus located below the aperture has an adequate assignable capacity;
assigns to the adapter circuit a portion of the system resource reserved for the computer bus located below the lowest assigned value if the system resource reserved for the computer bus is determined to have an adequate assignable capacity.

20. The computer system of claim 19 wherein the system resource reserved for the computer bus are assigned to devices coupled to the computer bus in a top down configuration.

21. The computer system of claim 19 wherein the portion of the system resource assigned to the adapter circuit includes a highest assignable portion of the system resource reserved for the computer bus located below the lowest assigned value.

22. The computer system of claim 19 further comprising:
a second bus having at least one hot insertable adapter connector for coupling an adapter circuit to the second computer bus;
wherein the least one non volatile memory stores computer executable hot insertion code for assigning at least one system resource of the computer system to an adapter circuit hot inserted to the computer system via a hot insertable adapter connector of the second computer bus.

23. The computer system of claim 19 wherein the computer bus conforms to a standard based upon a Peripheral Component Interface (PCI) bus specification.

24. The computer system of claim 19 wherein the system resource includes memory address space.

25. The computer system of claim 19 wherein the system resource includes I/O address space.

26. The computer system of claim 19 wherein the assignment of the at least one system resource to an adapter circuit is compatible with a Peripheral Component Interface (PCI) Hot-Plug Specification.

27. The computer system of claim 19 wherein:
the system resource reserved for the computer bus is reserved in multiple apertures;
the portion of the system resource assigned to the adapter circuit includes a portion of an aperture of the multiple apertures having an adequate assignable capacity located below the lowest assigned value.

28. The computer system of claim 19 wherein:
the hot insertable adapter connector includes a slot connector configured to receive adapter cards having adapter circuits mounted thereupon.

29. The computer system of claim 19 wherein:
wherein the assignment to the adapter circuit a portion of the system resource further includes assigning to the adapter circuit a portion of the second aperture if the second aperture is determined to have an adequate assignable capacity.

30. A computer system comprising:
a computer bus having at least one hot insertable adapter connector;
a hot insertion system for assigning at least one system resource to an adapter circuit hot inserted to a computer system via a hot insertable adapter connector of the computer bus, wherein the hot insertion system assigns a portion of a system resource reserved for a computer bus to an adapter circuit hot inserted to the computer system via a hot insertable adapter connector of the computer bus, the portion assigned being located below a lowest assigned value assigned to a device operably coupled to the computer bus, wherein the lowest assigned value is located in an aperture of a system resource reserved for the computer bus, wherein in assigning a portion of a system resource, the hot insertion system determinations whether the system resource reserved for the computer bus has an adequate assignable capacity, wherein the determination further includes:
a determination of whether the aperture has an adequate assignable capacity for the required quantity; and
a determination, if the aperture does not have an adequate assignable capacity, whether a second aperture of the system resource reserved for the computer bus located below the aperture has an adequate assignable capacity.

31. The computer system of claim 30 wherein the portion of the system resource assigned is from below the lowest assigned value to a value equal to the lowest assigned value minus a required quantity of the system resource for the adapter circuit.

32. The computer system of claim 30 wherein the portion of the system resource assigned to the adapter circuit includes the highest assignable portion of the system resource reserved for the computer bus located below the lowest assigned value.

33. The computer system of claim 30 wherein the system resource reserved for the computer bus are assigned to devices coupled to the computer bus in a top down configuration.

34. The computer system of claim 30 wherein the computer bus conforms to a standard based upon a Peripheral Component Interface (PCI) bus specification.

35. The computer system of claim 30 wherein the at least one system resource includes memory address space.

36. The computer system of claim 30 wherein the at least one system resource includes I/O address space.

37. The computer system of claim 30 wherein the at least one system resource includes an interrupt number.

38. The computer system of claim 30 wherein the hot insertion system is compatible with a Peripheral Component Interface (PCI) Hot-Plug Specification.

39. The computer system of claim 30 further comprising:
an operating system, wherein at least a portion of the hot insertion system is implemented as a bus driver of the operating system.

40. The computer system of claim 30 wherein:
the system resource reserved for the computer bus is reserved in multiple apertures;
the portion of the system resource assigned to the adapter circuit includes a portion of an aperture of the multiple apertures having an adequate assignable capacity located below the lowest assigned value.

41. The computer system of claim 30 wherein the system resources include memory address space and I/O address space, wherein the hot insertion system assigns to the adapter circuit both a portion of the memory address space reserved for the computer bus below the lowest assigned memory address and a portion of the I/O address space reserved for the computer bus below the lowest assigned I/O address.

42. The computer system of claim 30 wherein:
the hot insertable adapter connector includes a slot connector configured to receive adapter cards having adapter circuits mounted thereupon.

43. The computer system of claim 30 wherein for a like-for-like hot removal and insertion of an adapter circuit with an adapter connector of the computer bus, the hot insertion system assigns a same portion of the at least one system resource to a hot inserted adapter circuit as was assigned to a hot removed adapter circuit of the same type.

44. The computer system of claim 30 wherein:
wherein the assignment to the adapter circuit a portion of the system resource further includes assigning to the adapter circuit a portion of the second aperture if the second aperture is determined to have an adequate assignable capacity.

45. An article of manufacture comprising:
a computer readable media storing computer executable hot insertion code for assigning at least one system resource of the computer system to an adapter circuit hot inserted to the computer system via a hot insertable adapter connector of a computer bus, wherein execution of the computer executable hot insertion code:
determines a lowest assigned value assigned to a device on the computer bus of a system resource reserved for the computer bus;
determines a required quantity of the system resource required by the adapter circuit;
determines whether the system resource reserved for the computer bus has an adequate assignable capacity for the required quantity below the lowest assigned value, wherein the lowest assigned value is located in an aperture of the system resource reserved for the computer bus, wherein the determination of whether the system resource reserved for computer bus has an adequate assignable capacity further includes:
a determination of whether the aperture has an adequate assignable capacity for the required quantity; and
a determination, if the aperture does not have an adequate assignable capacity, whether a second aperture of the system resource reserved for the computer bus located below the aperture has an adequate assignable capacity;
assigns to the adapter circuit a portion of the system resource reserved for the computer bus located below the lowest assigned value if the system resource reserved for the computer bus is determined to have an adequate assignable capacity.

46. The article of manufacture of claim 45 wherein the assignment of the at least one system resource to an adapter circuit is compatible with a Peripheral Component Interface (PCI) Hot-Plug Specification.

47. The article of manufacture of claim 45 wherein:
the system resource reserved for the computer bus is reserved in multiple apertures;
the portion of the system resource assigned to the adapter circuit includes a portion of an aperture of the multiple apertures having an adequate assignable capacity located below the lowest assigned value.

48. The article of manufacture of claim 45 wherein the computer bus conforms to a standard based upon a Peripheral Component Interface (PCI) bus specification.

49. The article of manufacture of claim 45 wherein the at least one system resource includes memory address space.

50. The article of manufacture of claim 45 wherein the at least one system resource includes I/O address space.

51. The article of manufacture of claim 45 wherein the portion of system resource assigned to the adapter circuit includes the highest assignable portion the system resource reserved for the computer bus located below the lowest assigned value.

52. The article of manufacture of claim 45 wherein:
wherein the assignment to the adapter circuit a portion of the system resource further includes assigning to the adapter circuit a portion of the second aperture if the second aperture is determined to have an adequate assignable capacity.

* * * * *